(12) United States Patent
Ando

(10) Patent No.: US 8,419,040 B2
(45) Date of Patent: Apr. 16, 2013

(54) TOW HOOK SUPPORT DEVICE FOR VEHICLE

(75) Inventor: Nobuhiro Ando, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 146 days.

(21) Appl. No.: 12/929,533

(22) Filed: Jan. 31, 2011

(65) Prior Publication Data

US 2011/0187081 A1      Aug. 4, 2011

(30) Foreign Application Priority Data

Feb. 2, 2010   (JP) .................................. 2010-020902

(51) Int. Cl.
*B60R 19/34*      (2006.01)
(52) U.S. Cl.
USPC .......................... 280/495; 280/500; 280/491.5
(58) Field of Classification Search .................. 280/495, 280/500, 491.5
See application file for complete search history.

(56) References Cited

U.S. PATENT DOCUMENTS

| | | | |
|---|---|---|---|
| 6,929,297 B2 * | 8/2005 | Muller et al. ................. | 293/133 |
| 8,251,414 B2 * | 8/2012 | Brown ........................... | 293/102 |
| 2004/0041416 A1 * | 3/2004 | Harrison et al. .............. | 293/117 |
| 2004/0207217 A1 | 10/2004 | Muller et al. | |
| 2008/0001383 A1 * | 1/2008 | Hodoya et al. ................ | 280/477 |

FOREIGN PATENT DOCUMENTS

| | | |
|---|---|---|
| DE | 103 59 483 A1 | 7/2005 |
| DE | 103 59 485 A1 | 7/2005 |
| EP | 1 464 546 A2 | 10/2004 |
| JP | 2004-122863 | 4/2004 |

OTHER PUBLICATIONS

European Search Report dated Jun. 30, 2011, Yes.

* cited by examiner

*Primary Examiner* — Kevin Hurley
(74) *Attorney, Agent, or Firm* — Finnegan, Henderson, Farabow, Garrett & Dunner, LLP

(57) ABSTRACT

A tow hook support device for a vehicle, includes a vehicle structural member having a tubular shaped sidewall, and integrally provided to a vehicle body in a posture such that an axial direction of the tubular shaped sidewall coincides with a longitudinal direction of the vehicle; and a nut member integrally fixed to a tip of the vehicle structural member so as to be extended parallel to the axial direction of the tubular shaped sidewall, to which a tow hook is screwed and detachably fitted, the tow hook support device comprises, multiple grooves formed in the tubular shaped sidewall of the vehicle structural member so as to be positioned around an axis O of the tubular shaped sidewall and extended in the axial direction, by bending portions of the sidewall, and the nut member being arranged at a position in the tubular shaped sidewall and further inward than the multiple grooves so as to be coaxial with the axis O or extended parallel to the axis O, and being integrally fixed to the multiple grooves.

16 Claims, 7 Drawing Sheets

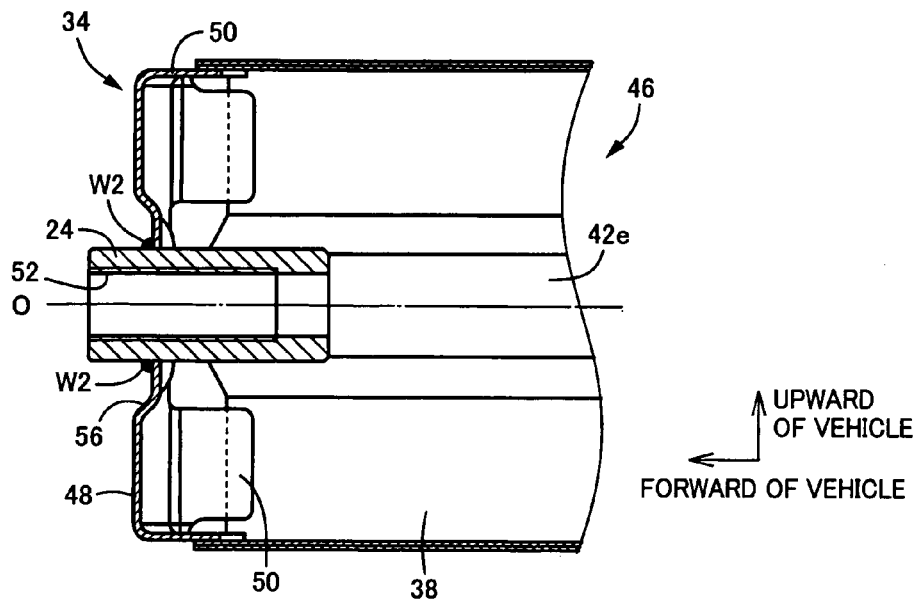
FIG.4A
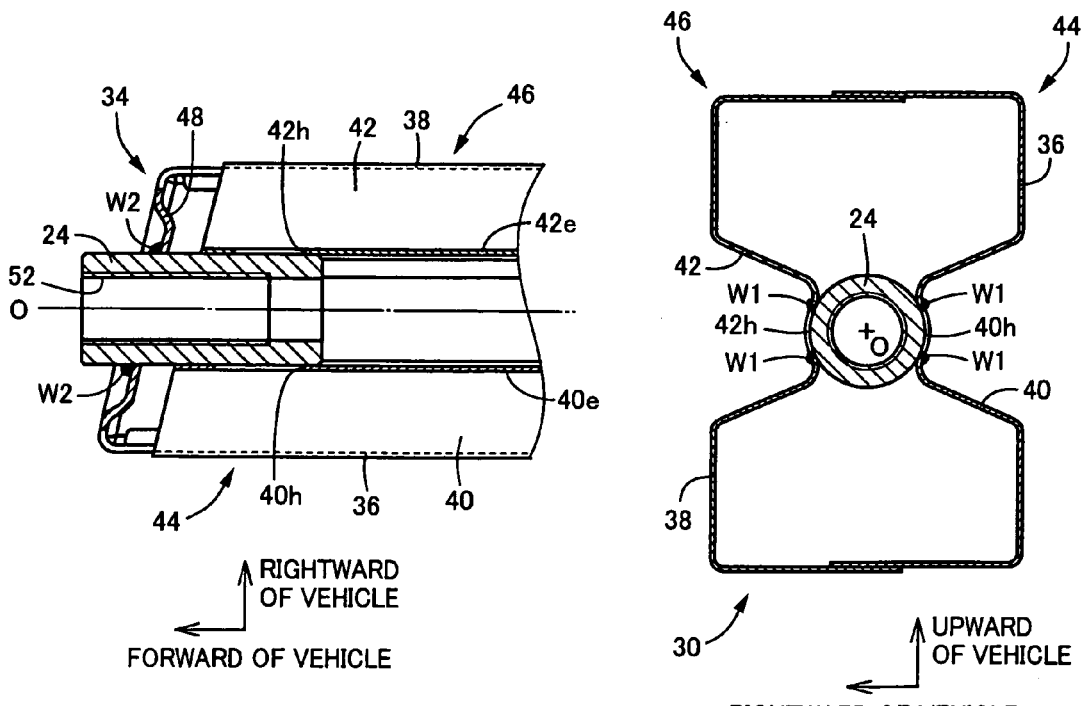
FIG.4B
FIG.4C

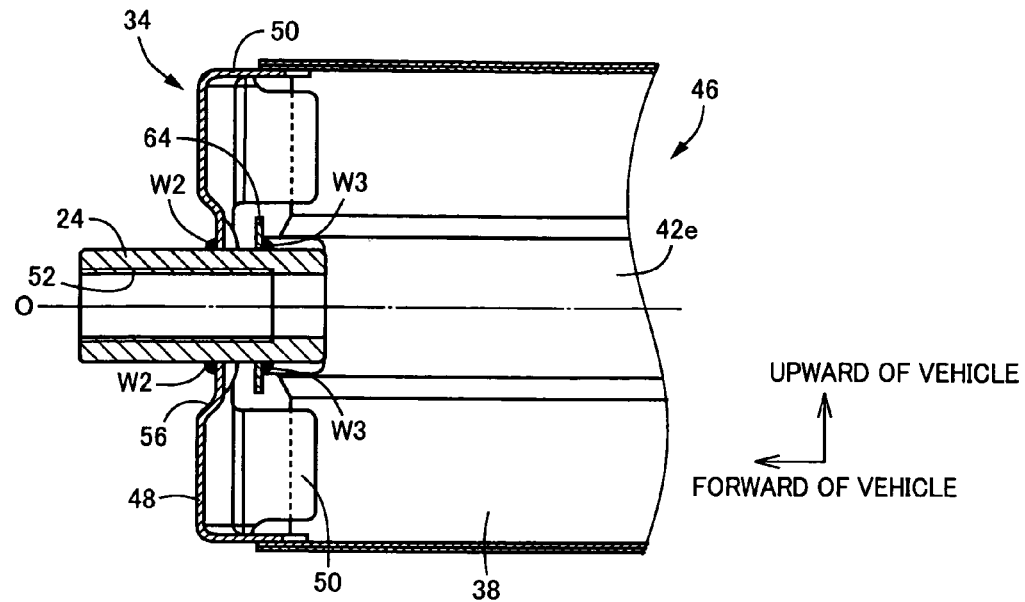
FIG.7A
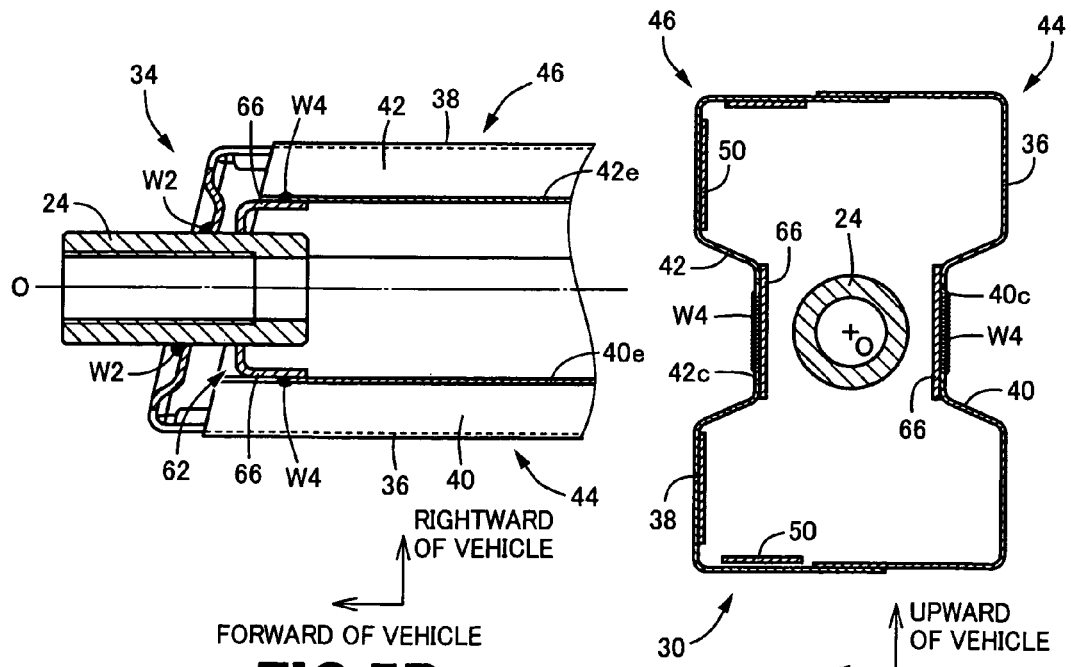
FIG.7B
FIG.7C

TOW HOOK SUPPORT DEVICE FOR VEHICLE

INCORPORATION BY REFERENCE

The disclosure of Japanese Patent Application No. 2010-020902 filed on Feb. 2, 2010 including the specification, drawings and abstract is incorporated herein by reference in its entirety.

BACKGROUND OF THE INVENTION

1. Field of the Invention

The invention relates generally to a tow hook support device for a vehicle, and more specifically to a tow hook support device that is easily and compactly formed at low cost while ensuring a predetermined support strength.

2. Description of the Related Art

There is a known tow hook support device for a vehicle, which includes a) a vehicle structural member having a tubular shaped sidewall, and integrally provided to a vehicle body in a posture such that the axial direction of the tubular shaped sidewall coincides with the longitudinal direction of the vehicle, and b) a nut member integrally fixed to a tip portion of the vehicle structural member so as to be extended parallel to the axial direction of the tubular shaped sidewall, c) to which a tow hook is screwed and detachably fitted. An example of such a tow hook support device is described in Japanese Patent Application Publication No. 2004-122863 (JP 2004-122863 A). According to JP 2004-122863 A, a nut member is integrally fixed to a tip portion of a side member as a vehicle structural member with a pair of bolts via a given fitting bracket.

However, in the tow hook support device described in JP 2004-122863 A, a relatively large fitting bracket having a rectangular box shape is used, and the fitting bracket is fitted so as to straddle both the side member and a cross member. Thus, it is possible to obtain a predetermined support strength with which a tow hook is supported. Therefore, the structure of the tow hook support device becomes complicated and the size thereof becomes large, which increases the weight and cost of the tow hook support device.

SUMMARY OF INVENTION

The invention is made in light of the above-described circumstances, and it is an object of the invention to provide a tow hook support device that is easily and compactly formed at low cost while ensuring a predetermined support strength.

The object described above can be achieved according to a first aspect of the present invention, which provides a tow hook support device for a vehicle, including (a) a vehicle structural member having a tubular shaped sidewall, and integrally provided to a vehicle body in a posture such that an axial direction of the tubular shaped sidewall coincides with a longitudinal direction of the vehicle; and (b) a nut member integrally fixed to a tip of the vehicle structural member so as to be extended parallel to the axial direction of the tubular shaped sidewall, (c) to which a tow hook is screwed and detachably fitted, the tow hook support device comprising, (d) multiple grooves formed in the tubular shaped sidewall of the vehicle structural member so as to be positioned around an axis O of the tubular shaped sidewall and extended in the axial direction, by bending portions of the sidewall, and (e) the nut member being arranged at a position in the tubular shaped sidewall and further inward than the multiple grooves so as to be coaxial with the axis O or extended parallel to the axis O, and being integrally fixed to the multiple grooves.

The second aspect of the present invention provides the tow hook support device for a vehicle according to the first aspect of the invention, wherein: (a) at least an end portion of each of the grooves, brought into surface-contact with an outer peripheral surface of the nut member, has a shape that corresponds to a shape of the outer peripheral surface of the nut member; and (b) the nut member is arranged so as to be contact with the grooves from an inside of the tubular shaped sidewall, and is directly and integrally fixed to the grooves by welding.

The third aspect of the present invention provides the tow hook support device for a vehicle according to the first or second aspect of the invention, wherein: (a) the grooves are a pair of concave grooves that are formed so as to be projected inward in the tubular shaped sidewall toward the axis O; and (b) the nut member is arranged coaxially with the axis O, and is integrally fixed to the pair of concave grooves.

The fourth aspect of the present invention provides the tow hook support device for a vehicle according to any of the first to third aspects of the invention, wherein the multiple grooves are formed so as to be axisymmetric or plane-symmetric with respect to the axis O.

The description that "the grooves are axisymmetric with respect to the axis O" means that the multiple grooves are formed at positions that are at equiangular intervals around the axis O and are apart from the axis O by the same distance, and the arrangement has rotational symmetries. The state where the grooves are axisymmetric with respect to the axis O includes the state where a pair of grooves are formed symmetrically with respect to the axis O and the state where three or more grooves are formed at equiangular intervals around the axis O. The description that "the grooves are plane-symmetric with respect to the axis O" means that the grooves are symmetric (plane-symmetric) with respect to any plane that passes through the axis O. The state where the grooves are plane-symmetric with respect to the axis O includes the state where the grooves are axisymmetric with respect to the axis O and the state where the grooves are not axisymmetric with respect to the axis O.

The fifth aspect of the present invention provides the tow hook support device for a vehicle according to the first aspect of the invention, wherein: a fitting bracket is integrally fixed to the nut member; and the nut member is integrally fixed to the grooves via the fitting bracket.

The sixth aspect of the present invention provides the tow hook support device for a vehicle according to any of the first to fifth aspects of the invention, wherein: (a) the vehicle structural member includes an end cover that is integrally fixed to a tip of the tubular shaped sidewall; (b) and a nut passing hole is formed in the end cover, the nut member is passed through the nut passing hole, and the nut member is integrally fixed to a peripheral portion around the nut passing hole in addition to the grooves.

The seventh aspect of the present invention provides the tow hook support device for a vehicle according to any of the first to sixth aspects of the invention, wherein: (a) the vehicle structural member is a crush box that absorbs impact energy by crushing in an accordion manner upon reception of a compression load applied in the axial direction; and (b) the grooves are formed along an entire axial length of the crush box.

In the tow hook support device for a vehicle described above, the multiple grooves that project inward or outward in the tubular shaped sidewall are formed in the tubular shaped sidewall of the vehicle structural member, so as to be extended in the axial direction. In addition, the nut member is arranged at a position inside of the multiple grooves so as to be coaxial with the axis O or extended parallel to the axis O, and is integrally fixed to the grooves. In this case, because the multiple grooves are formed so as to be extended in the axial direction by bending portions of the tubular shaped sidewall, the number of edge lines of the vehicle structural member becomes large. Therefore, the strength of the vehicle structural member against an axial load is increased. As a result, it is possible to increase the support strength with which the tow hook is supported. Thus, it is possible to easily and compactly form the tow hook support device at low cost, using the vehicle structural member and the nut member as main components, while ensuring a predetermined support strength with which the tow hook is supported.

According to the second aspect of the present invention, at least a portion of a bottom portion or a top portion of each of the grooves brought into surface-contact with an outer peripheral surface of the nut member, has a shape that corresponds to a shape of the outer peripheral surface of the nut member, and the nut member is arranged so as to be contact with the grooves from an inside of the tubular shaped sidewall, and is directly and integrally fixed to the grooves by welding. Therefore, the nut member is firmly fixed to the grooves without using a fitting bracket, and the tow hook support device is more easily and more compactly formed at lower cost.

According to the third aspect of the present invention, the grooves are a pair of concave grooves that are formed so as to be projected inward in the tubular shaped sidewall toward the axis O, and the nut member is arranged coaxially with the axis O, and is integrally fixed to the pair of concave grooves. Therefore, it is possible to more easily form the tow hook support device having a more compact size at lower cost, as compared with the case where three or more grooves are formed or projecting grooves that projected outward in the tubular shaped sidewall are formed.

According to the fourth aspect of the present invention, the multiple grooves are formed so as to be axisymmetric or plane-symmetric with respect to the axis O. Therefore, a tow load that is applied from the tow hook to the nut member during towing is efficiently transmitted to the vehicle structural member through a plurality of grooves without imbalance. Then, the tow load is appropriately received by the vehicle structural member. Therefore, it is possible to more easily and more compactly form the tow hook support device at lower cost, using the vehicle structural member and the nut member as main components, while ensuring a predetermined support strength with which the tow hook is supported.

According to the fifth aspect of the present invention, the nut member is integrally fixed to the grooves via a fitting bracket. Therefore, it is possible to easily fit the nut member having a predetermined size to various vehicle structural members of a vehicle by just changing the fitting bracket.

According to the sixth aspect of the present invention, the vehicle structural member includes an end cover and a nut passing hole is formed in the end cover, the nut member is passed through the nut passing hole, and the nut member is integrally fixed to a peripheral portion around the nut passing hole. Therefore, the nut member is more firmly fixed to the vehicle structural member in a certain position. Accordingly, it is possible to more efficiently and appropriately transmit a tow load from the nut member to the vehicle structural member, and it is possible to reduce the weight of the tow hook support device by reducing the plate thickness of both the end cover and the vehicle structural member.

According to the seventh aspect of the present invention, the vehicle structural member is a crush box and the grooves are formed along an entire axial length of the crush box so that the axial strength of the crush box is increased. Thus, it is possible to increase both the support strength with which the tow hook is supported and the performance of absorbing impact energy, or it is possible to reduce the weight of the tow hook support device by reducing the plate thickness of the crush box, while ensuring the support strength and the performance of absorbing impact energy.

BRIEF DESCRIPTION OF DRAWINGS

The foregoing and further objects, features and advantages of the invention will become apparent from the following description of example embodiments with reference to the accompanying drawings, wherein like numerals are used to represent like elements and wherein:

FIGS. 1A and 1B are views that illustrate a tow hook support device for a vehicle according to a first embodiment of the invention, wherein FIG. 1A is a plan view of a tip portion to which a tow hook is fitted, and FIG. 1B is a side view of the tip portion viewed from a position under the tow hook support device in FIG. 1A;

FIGS. 3A and 3B are views that illustrate the tow hook support device in FIGS. 1A and 1B, wherein FIG. 3A is a perspective view of the tow hook support device viewed from a position that is above and diagonally to the left front of the tow hook support device, and FIG. 3B is an exploded perspective view of components before being integrally assembled together, for example, by welding;

FIGS. 4A to 4C are sectional views that illustrate the tow hook support device in FIGS. 1A and 1B, wherein FIG. 4A is a sectional view taken along the line IVA-IVA in FIG. 1A, FIG. 4B is a sectional view taken along the line IVB-IVB in FIG. 1B, and FIG. 4C is a sectional view taken along the line IVC-IVC in FIG. 1B;

FIGS. 5A and 5B are views that illustrate a tow hook support device for a vehicle according to a second embodiment of the invention and that correspond to FIGS. 1A and 1B, respectively, wherein FIG. 5A is a plan view of a tip portion to which a tow hook is fitted, and FIG. 5B is a side view of the tip portion viewed from a position under the tow hook support device in FIG. 5A;

FIGS. 6A and 6B are views that illustrate the tow hook support device in FIGS. 5A and 5B, wherein FIG. 6A is a perspective view of the tow hook support device viewed from a position that is above and diagonally to the left front of the tow hook support device, and FIG. 6B is an exploded perspective view of components before being integrally assembled together, for example, by welding; and FIGS. 7A to 7C are sectional views that illustrate the tow hook support device in FIGS. 5A and 5B, wherein FIG. 7A is a sectional view taken along the line VIIA-VIIA in FIG. 5A, FIG. 7B is a sectional view taken along the line VIIB-VIIB in FIG. 5B, and FIG. 7C is a sectional view taken along the line VIIC-VIIC in FIG. 5B.

DETAILED DESCRIPTION OF EMBODIMENTS

Figure 1A:
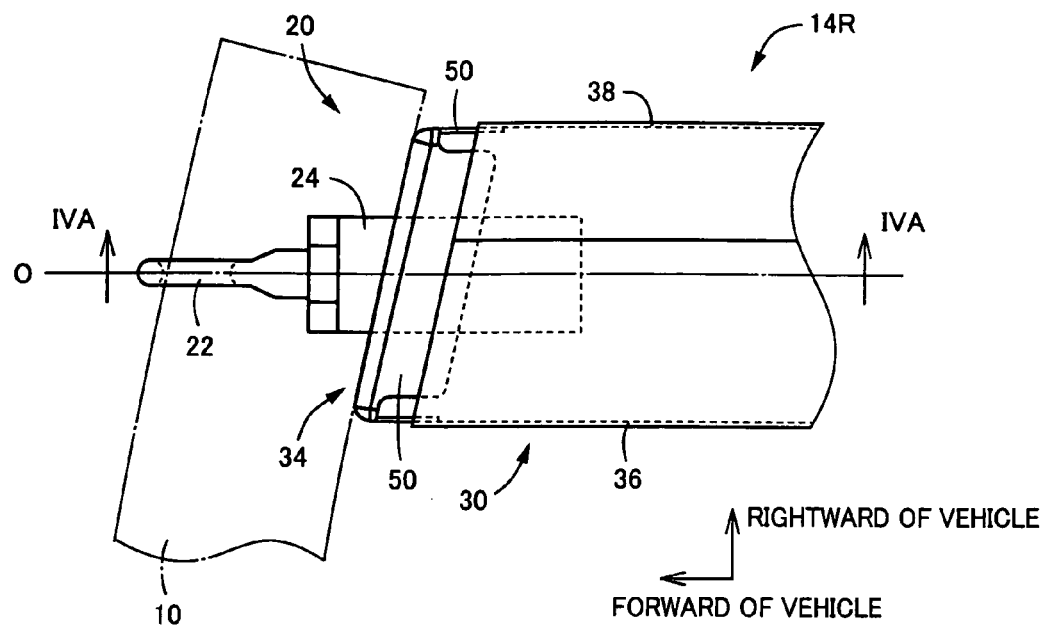

A tow hook support device for a vehicle according to the invention may be a device that is mounted in a front-side of the vehicle, or a device that is mounted in a rear-side of the vehicle. The tow hook support device may be applied to each of both the front-side and the rear-side of the vehicle, or may be applied to only one of the front-side and the rear-side. The tow hook support device is usually provided at one of a right-side and a left-side of the vehicle. However, the tow hook support device may be provided at each of both the right-side and the left-side of the vehicle.

As a vehicle structural member, a side member of a vehicle body or a crush box that is integrally fixed to, for example, a tip portion of the side member is suitably used. However, another vehicle structural member may be used. As the tubular shaped sidewall of the vehicle structural member, a polygonal tubular shaped sidewall having multiple flat plate-shaped sidewall portions around the axis O is suitably employed. For example, a tubular shaped sidewall having a square cross-section or a rectangular cross section is suitably employed as the tubular shaped sidewall of the vehicle structural member. However, the vehicle structural member may be in a shape in which part of the sidewall portions has a curved shape such as an arc shape. The vehicle structural member is formed, for example, so as to have a constant cross-sectional shape along the entire axial length. However, it is possible to employ various forms. For example, the vehicle structural member may be formed in a tapered shape so that the cross-sectional shape thereof changes from one end toward the other end.

The vehicle structural member is integrally fixed to the vehicle body in such a posture that the axial direction of the tubular shaped sidewall coincides with the longitudinal direction of the vehicle. However, the axial direction of the tubular shaped sidewall need not strictly coincide with the longitudinal direction of the vehicle body. For example, the vehicle structural member may be fixed integrally to the vehicle body in such a posture that the axial direction of the tubular shaped sidewall is inclined, in the lateral direction or the up-down direction, relative to the longitudinal direction by approximately 10° or an angle smaller than 10°.

Preferably, the tubular shaped sidewall has a cross-sectional shape that is, for example, axisymmetric or plane-symmetric with respect to the axis O. However, the tubular shaped sidewall may have a cross-sectional shape other than an axisymmetric shape or a plane-symmetric shape with respect to the axis O. In this case, for example, the barycentric position of the cross-sectional shape is on the axis O of the tubular shaped sidewall.

The grooves formed in the sidewall of the vehicle structural member are preferably formed into concave grooves by bending portions of the sidewall such that the grooves project inward in the tubular shape. However, when the vehicle structural member has a long rectangular cross-sectional shape and the diameter of the nut member is larger than the width of the vehicle structural member, the grooves may be formed into projecting grooves by bending portions of the sidewall such that the grooves project outward in the tubular shape in order to fit the nut member between the grooves. These grooves are formed, for example, along the entire axial length of the vehicle structural member. However, the grooves need not be formed along the entire axial length of the vehicle structural member, as long as the grooves are formed in at least the portions of the sidewall, at which the nut member is arranged. When the grooves project inward, the tip portions of the concave grooves, which are further inward than the sidewall, are referred to as "bottom portions". When the grooves project outward, the tip portions of the projecting grooves, which are further outward than the sidewall, are referred to as "top portions".

The nut member is formed of a member having, for example, a cylindrical shape or a polygonal tubular shape. An internally threaded hole to which the tow hook can be screwed is formed along the central axis of the nut member. The threaded hole may be formed so as to pass through the nut member. Alternatively, the threaded hole may be formed so as to extend up to any midpoint of the nut member.

When the nut member is directly fixed to the bottom portions or the top portions of the grooves, for example, by welding or with adhesive agent, preferably, the bottom portions or the top portions are formed in a shape (e.g. arc shape) that corresponds to the shape of the outer peripheral surface of the nut member so that the bottom portions or the top portions are brought into surface-contact with the outer peripheral surface of the nut member. However, the bottom portions or the top portions of the grooves may have a flat plate shape so that the bottom portions or the top portions are brought into line-contact with the outer peripheral surface of the nut member having, for example, a cylindrical shape. Cutouts or openings are formed in the grooves as needed. Then, for example, arc welding is performed along the end edges of the cutouts or the openings so that the nut member is integrally fixed to the grooves.

When the multiple grooves are formed axisymmetrically, the nut member can be arranged coaxially with the axis O of the tubular shaped sidewall. When the multiple grooves are formed surface-symmetrically, if these grooves are formed symmetrically with respect to the axis O, the nut member can be arranged coaxially with the axis O. However, if a pair of grooves are formed at positions that are not symmetric with respect to the axis O, the nut member is not coaxial with the axis O. In this case as well, a tow load is evenly transmitted to the pair of grooves without imbalance, and the tow load is appropriately received by the vehicle structural member. The multiple grooves may be formed in manners other than the manner in which the multiple grooves are formed axisymmetrically or the manner in which the multiple grooves are formed plane-symmetrically. The nut member is arranged at a position inside the tubular shaped sidewall and further inward than the multiple grooves, and integrally fixed to these grooves.

According to the fifth aspect of the invention, the nut member is integrally fixed to the grooves via the fitting bracket. For example, when the vehicle structural member has a pair of grooves that are symmetric with respect to the axis O, the fitting bracket may be formed of a plate member that has a U-shaped cross section, and a nut passing hole may be formed in a flat center portion of the U-shaped plate member such that the center of the nut passing hole coincides with the axis O. Then, the nut member may be passed through the nut passing hole, and integrally fixed to the peripheral portion around the nut passing hole, for example, by welding. In addition, the U-shaped plate member may be integrally fixed at the both side portions thereof to the pair of grooves, for example, by welding. As the nut passing hole, for example, a burring hole having a relatively short cylindrical portion may be formed. As the nut passing hole formed in the end cover according to the sixth aspect of the invention, for example, a burring hole having a short cylindrical portion may be formed.

According to the sixth aspect of the invention, the end cover is provided, and the nut member is integrally fixed to the peripheral portion around the nut passing hole of the end cover. However, regardless of whether the end cover is provided, the nut member may be fixed only to the grooves formed in the vehicle structural member. In this case, preferably, portions of the nut member, which are within a predetermined axial length range, are fixed to the grooves, or multiple portions of the nut member, which are apart from each other in the axial direction, are fixed to the grooves, so that the posture of the nut member is stabilized.

The vehicle structural member having the tubular shaped sidewall may be formed in a tubular shape, for example, in the following manner. A pair of halves are formed of thin plate members, for example, by press working. Each of the halves has a substantially M-shaped cross section or the like obtained by dividing the tubular shape into two portions such that these two portions extend substantially parallel to the axial direction. Then, opening-side both end edge portions of one of the pair of halves are overlapped with opening-side both end edge portions of the other of the halves, respectively, and the opening-side both end edge portions of one of the halves are integrally connected to the opening-side both end edge portions of the other of the halves. Alternatively, one thin plate member may be subjected to bending work such that the thin plate member is formed into a predetermined polygonal cross-sectional shape, and the both end edge portions of this member are overlapped with each other and connected integrally to each other. As means for overlapping the end edge portions with each other and connecting the end edge portions to each other so as to form in a tubular shape, spot welding is suitably employed. Alternatively, another welding means, for example, arc welding may be employed. Further alternatively, a connecting member, for example, a rivet may be used to connect these portions to each other.

Figure 1B:
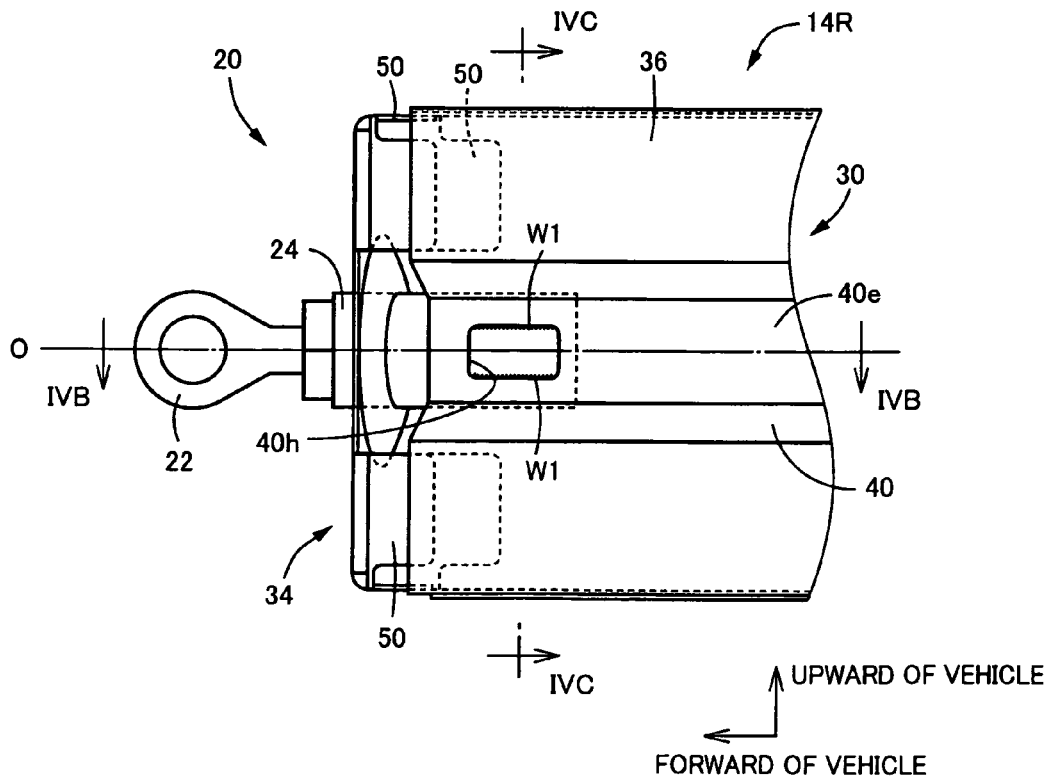
Figure 2:
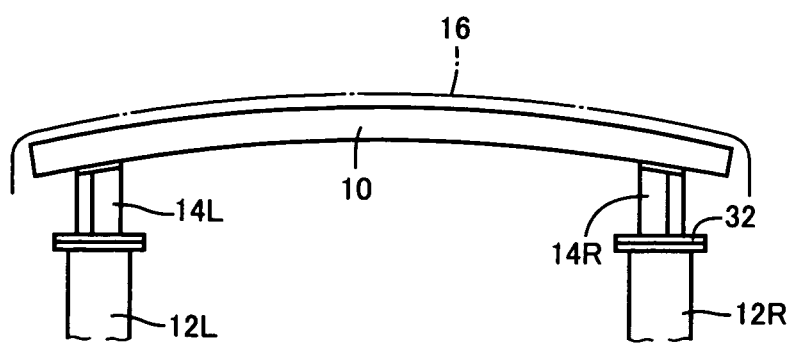
FIG. 2 is a plan view that illustrates a crush box constituting the tow hook support device in FIGS. 1A and 1B, viewed from a position above the vehicle.

Hereafter, embodiments of the invention will be described in detail with reference to the accompanying drawings. FIGS. 1A and 1B are views that illustrate a tow hook support device 20 for a vehicle according to a first embodiment of the invention. FIG. 1A is a plan view of a tip portion to which a tow hook 22 is fitted. FIG. 1B is a side view of the tip portion viewed from a position under the tow hook support device in FIG. 1A. The tow hook support device 20 is configured with the use of a right crush box 14R shown in FIG. 2. Alternatively, the tow hook support device 20 may be configured with the use of a left crush box 14L. If neither the crush box 14R nor the crush box 14L is provided, the tow hook support device 20 may be configured directly with the use of a tip portion of a side member 12R or 12L. FIG. 1A is a schematic plan view of a portion near a front bumper beam 10 of the vehicle, viewed from a position above the vehicle. The crush box 14L is disposed at a front end portion of the side member 12L, and the crush box 14R is disposed at a front end portion of the side member 12R. The bumper beam 10 is fixed at a left end portion and a right end portion to the crush box 14L and the crush box 14R, respectively.

Each of the crush boxes 14R and 14L has a tubular shaped sidewall. When an impact load is applied from ahead of the vehicle and the crush boxes 14R and 14L receive an axial compression load, the crush boxes 14R and 14L are crushed in an accordion manner. The impact energy is absorbed due to deformation of the crush boxes 14R and 14L at this time. Thus, the crush boxes 14R and 14L reduce the impact energy that is applied to vehicle structural members such as the side members 12R and 12L. The crush in an accordion manner is a phenomenon that occurs when the crush boxes 14R and 14L successively are buckled (bent into a dogleg shape) at multiple axial positions. The buckling usually starts from the bumper beam 10-side, that is, the impact receiving-side, and proceeds toward the vehicle body-side with the lapse of time. The bumper beam 10 functions as a reinforcement (reinforcement member) and an attaching member for a bumper. A bumper body 16 made of, for example, synthetic resin is integrally fixed to the bumper beam 10.

Figure 3A:
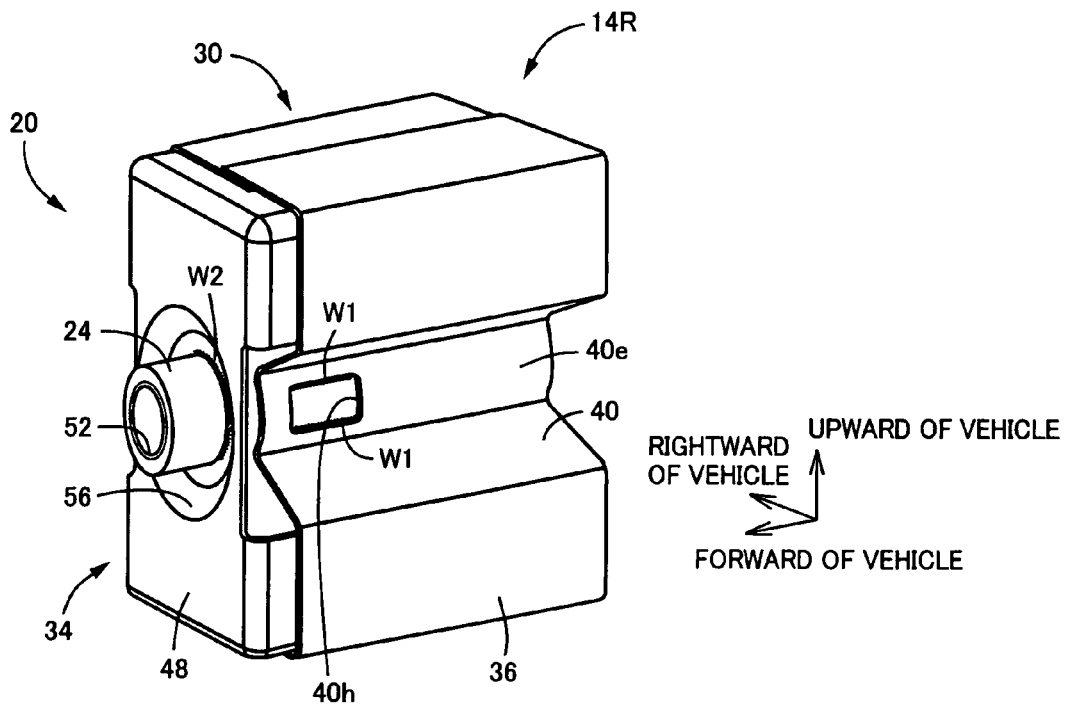
Figure 3B:
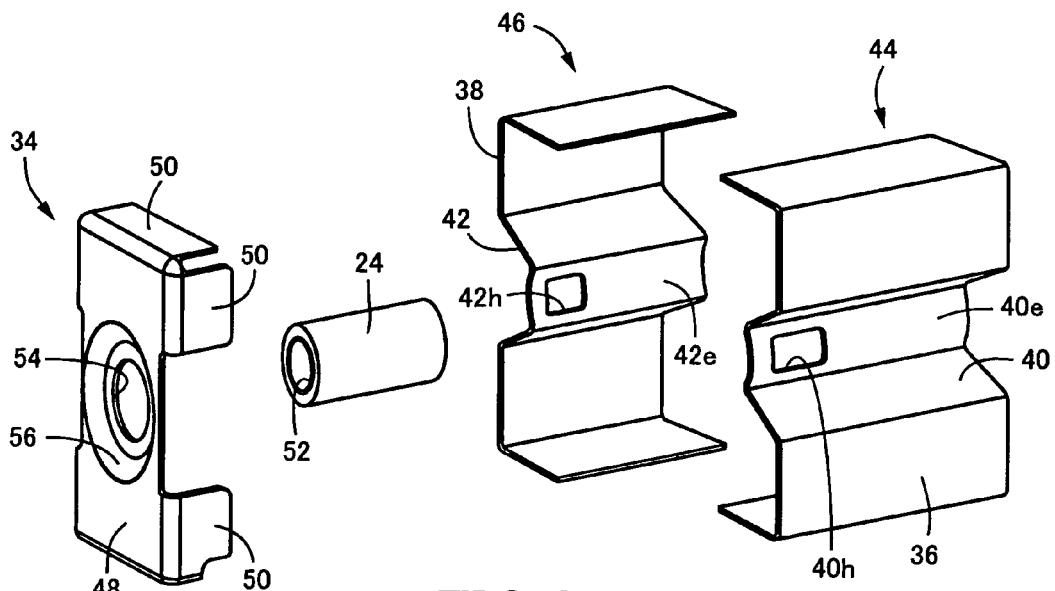

The tow hook support device 20 is formed by integrally fixing a nut member 24 to the crush box 14R. The tow hook support device 20 will be described in detail with reference to FIGS. 1A, 1B, 3A, 3B and 4A to 4C. FIGS. 3A and 3B are views that illustrate the tow hook support device 20. FIG. 3A is a perspective view of the tow hook support device 20 viewed from a position that is above and diagonally to the left front of the tow hook support device 20. FIG. 3B is an exploded perspective view of components before being integrally assembled together, for example, by welding.

FIGS. 4A to 4C are sectional views that illustrate portions of the tow hook support device 20. FIG. 4A is a sectional view taken along the line IVA-IVA in FIG. 1A. FIG. 4B is a sectional view taken along the line IVB-IVB in FIG. 1B. FIG. 4C is a sectional view taken along the line IVC-IVC in FIG. 1B. FIGS. 3A and 3B and FIGS. 4A to 4C show the state where the tow hook 22 is removed from the tow hook support device 20. The tow hook 20 is screwed to the nut member 24 so that the tow hook 20 is detachably fitted to the nut member 24.

The crush box 14R has a hollow tubular body 30 that has multiple flat plate-shaped sidewall portions, having a polygonal cross section and a tubular shape. An attaching plate 32 (see FIG. 2) is integrally welded to a rear end portion of the tubular body 30. The crush box 14R is integrally fixed to the tip portion of the side member 12R, for example, with a bolt (not shown) via the attaching plate 32, in such a posture that the axial direction of the tubular body 30 is substantially parallel to the longitudinal direction of the vehicle. An end cover 34 is integrally fixed to a tip portion of the tubular body 30, for example, by spot welding. The bumper beam 10 is integrally fixed to the end cover 34. In the first embodiment, the crush box 14R corresponds to the vehicle structural member.

A cross section of the tubular body 30, which is perpendicular to the axial direction thereof, has a rectangular shape that is long in the up-down direction. A pair of left and right sidewall portions 36 and 38 have a wide and flat plate shape, and form two sides, which are parallel to each other, in the rectangular cross section of the tubular body 30. Concave grooves 40 and 42 are formed in the sidewall portions 36 and 38 so as to be extended along the entire axial length, respectively. The concave groove 40 and 42 are formed in center portions of the sidewall portions 36 and 38, that is, at portions that are axisymmetric with respect to the axis O of the tubular body 30. The concave grooves 40 and 42 are formed by symmetrically bending portions of the sidewall portions 36 and 38 such that these portions trapezoidally project inward. Each of the concave grooves 40 and 42 has a substantially isosceles trapezoidal cross section. The concave grooves 40 and 42 are axisymmetric with respect to the axis O, and plane-symmetric with respect to a plane passing through the axis O and extending in the up-down direction. In the first embodiment, the tubular body 30 is also axisymmetric and plane-symmetric with respect to the axis O. If the concave grooves 40 and 42 are formed in this way, the number of edge lines extending in the axial direction of the tubular body 30 becomes large. Therefore, the strength of the crush box 14R against an axial load is increased.

As is clear from the exploded perspective view in FIG. 3B, the tubular body 30 is formed of a pair of halves 44 and 46. Each of the halves 44 and 46 has a substantially M-shaped cross section obtained by dividing the shape of the tubular body 30 into right and left two portions such that these two portions extend substantially parallel to the axial direction and are substantially symmetric. Each of the pair of halves 44 and 46 is formed by applying a bending process or the like to a thin plate member by pressing respectively. The tubular body 30 is formed by overlapping opening-side upper end edge portion and lower end edge portion of one of the pair of halves 44 and 46 with opening-side upper end edge portion and lower end edge portion of the other of the halves 44 and 46, respectively, and integrally connecting the upper end edge portions together and connecting the lower end edge portions together, for example, by spot welding. The tubular body 30 has a straight shape, that is, the tubular body 30 has a constant cross-sectional shape in the axial direction. However, the tip edge of the tubular body 30, to which the end cover 34 is fixed, is inclined with respect to the axis O such that the shape of the tubular body 30 conforms to the shape of the bumper beam 10. The end cover 34 has a rectangular front plate portion 48 that corresponds to the tip shape of the tubular body 30, and multiple bent portions 50 that are formed by bending portions of a plate that forms the end cover 34, from a peripheral portion of the front plate portion 48 toward the tubular body 30. The multiple bent portions 50 are fitted, in substantially parallel, inside the tip portion of the tubular body 30 respectively while the end cover 34 is in such a posture that the front plate portion 48 is inclined with respect to the axis O so as to correspond to the tip edge of the tubular body 30. In this state, the end cover 34 is integrally fixed to the tubular body 30, for example, by spot welding or arc welding. The axis O of the tubular body 30 functions also as the axis of the crush box 14R.

The nut member 24 is a cylindrical member, and a threaded hole 52, into which a threaded shaft of the tow hook 22 is screwed, is formed along the axis of the nut member 24. The nut member 24 is provided coaxially with the axis O of the crush box 14R, at a position inside the tubular shape and further inward than the concave grooves 40 and 42. The nut member 24 is integrally fixed to the crush box 14R such that a front end portion, in which the threaded hole 52 is formed, projects frontward from the end cover 34. The amount by which each of the concave grooves 40 and 42 projects inward is set based on the outer diameter of the nut member 24. Bottom portions 40e and 42e of the concave grooves 40 and 42 contact the outer peripheral surface of the nut member 24. Each of the bottom portions 40e and 42e is formed in a shape that corresponds to the shape of the outer peripheral surface of the nut member 24, more specifically, in a partial cylindrical shape having an arc cross section, so that the bottom portions 40e and 42e are brought into surface-contact with the outer peripheral surface of the nut member 24. When the nut member 24 is engaged between these bottom portions 40e and 42e, the position of the nut member 24 is determined such that the axis of the nut member 24 coincides with the axis O. Openings 40h and 42h are formed in the bottom portions 40e and 42e at portions that contact the nut member 24. The nut member 24 is directly and integrally welded to the concave grooves 40 and 42 by performing, for example, arc welding on an upper end edge and a lower end edge of each of the openings 40h and 42h. The axial length of each of the openings 40h and 42h is set such that a predetermined joint strength is obtained. Arc welding, for example, is performed on the upper end edge and the lower end edge of each of the openings 40h and 42h along the entire length thereof or at given intervals in the axial direction. First weld portions W1 are portions at which the nut member 24 and the concave grooves 40 and 42 are welded to each other. The left and right sidewall portions 36 and 38, in which the concave grooves 40 and 42 are formed, are sidewall portions for fixing a nut.

A nut passing hole 54 is formed in the front plate portion 48 of the end cover 34 such that the center of the nut passing hole 54 coincides with the axis O of the tubular body 30. The diameter of the nut passing hole 54 is set to a value that is equal to or slightly larger than the outer diameter of the nut member 24. The nut member 24 is passed through the nut passing hole 54, and a portion of the nut member 24 projects frontward from the end cover 34. In addition, the outer peripheral surface of the nut member 24 is integrally welded to a peripheral portion around the nut passing hole 54, for example, by arc welding. A second weld portion W2 is a portion at which the nut member 24 and the end cover 34 are welded to each other. A tapered recess portion 56 is formed in the front plate portion 48 of the end cover 34, at a position around the outer periphery of the nut passing hole 54. The tapered recess portion 56 has a conical shape, and is recessed toward the tubular body 30. The center axis of the tapered recess portion 56 coincides with the axis O of the tubular body 30. The nut passing hole 54 is formed in the bottom portion of the tapered recess portion 56. Due to formation of the tapered recess portion 56, it is possible to increase the strength of the end cover 34 against an axial load that is applied in an axial direction parallel to the axis O. As a result, it is possible to increase the support strength with which the nut member 24 is supported, and, consequently, it is possible to increase the support strength with which the tow hook 22 is supported.

In the tow hook support device 20 according to the first embodiment, among the multiple flat plate-shaped sidewall portions of the crush box 14R, the pair of left and right axisymmetrically-arranged sidewall portions 36 and 38 are used as the sidewall portions for fixing a nut. In addition, the concave grooves 40 and 42, which axisymmetrically project inward in the tubular body 30, are formed in the pair of sidewall portions 36 and 38 so as to be extended in the axial direction, respectively. Further, the nut member 24 is arranged at a position inside the tubular shaped sidewall and further inward than the concave grooves 40 and 42 such that the axis of the nut member 24 coincides with the axis O of the crush box 14R, and is integrally welded to the concave grooves 40 and 42. In this case, the pair of concave grooves 40 and 42 are formed so as to be extended in the axial direction by bending portions of the sidewall portions 36 and 38. Therefore, the number of the edge lines of the crush box 14R having the tubular shaped sidewall becomes large. Accordingly, the strength of the crush box 14R against an axial load is increased. Further, the pair of concave grooves 40 and 42 are axisymmetrically formed and the nut member 24 is arranged coaxially with the crush box 14R. Therefore, a tow load that is applied from the tow hook 22 to the nut member 24 during towing is efficiently transmitted to the crush box 14R without imbalance. Then, the tow load is appropriately received by the crush box 14R, and, consequently, is appropriately received by the side member 12R.

Thus in the tow hook support device 20 according to the first embodiment, the strength of the crush box 14R is increased due to the pair of concave grooves 40 and 42. As a result, it is possible to increase the support strength with which the tow hook 22 is supported. Thus, it is possible to easily and compactly form the tow hook support device 20 at low cost, using the crush box 14R and the nut member 24 as main components, while ensuring a predetermined support strength with which the tow hook 22 is supported.

In the first embodiment, the bottom portions 40e and 42e of the concave grooves 40 and 42 are formed in a partially cylindrical shape that corresponds to the shape of the outer peripheral surface of the nut member 24 so that the bottom portions 40e and 42e are brought into surface-contact with the outer peripheral surface of the nut member 24. The nut member 24 is arranged so as to be contact with the concave grooves 40 and 42 from the inside of the tubular shaped sidewall, and directly and integrally fixed to the concave grooves 40 and 42 by welding. Therefore, the nut member 24 is firmly fixed to the concave grooves 40 and 42 without using a fitting bracket, and the tow hook support device 20 is more easily and compactly formed at lower cost.

In the first embodiment, the pair of left and right sidewall portions 36 and 38, which are parallel to each other and symmetrically positioned with respect to the axis O, are used as the sidewall portions for fitting a nut. In addition, the pair of concave grooves 40 and 42 are formed in the pair of sidewall portions 36 and 38 so as to be projected toward the axis O inward in the tubular shaped sidewall, and the nut member 24 is fixed to the concave grooves 40 and 42. Therefore, it is possible to more easily and more compactly form the tow hook support device 20 at lower cost, as compared with the case where three or more concave grooves are formed or projecting grooves projecting outward in the tubular shaped sidewall are formed.

In the first embodiment, the pair of concave grooves 40 and 42 are axisymmetrically formed. Therefore, a tow load that is applied from the tow hook 22 to the nut member 24 during towing is efficiently transmitted to the crush box 14R through the pair of concave grooves 40 and 42 without imbalance. Then, the tow load is appropriately received by the crush box 14R, and, consequently, is appropriately received by the side member 12R. Therefore, it is possible to more easily and more compactly form the tow hook support device 20 at lower cost, using the crush box 14R and the nut member 24 as main components, while ensuring a predetermined support strength with which the tow hook 22 is supported. In the first embodiment, especially, the nut member 24 is arranged coaxially with the axis O. Therefore, a tow load that is applied from the tow hook 22 to the nut member 24 during towing is transmitted to the crush box 14R in a further well-balanced manner, and is appropriately received by the crush box 14R more appropriately.

The crush box 14R is provided integrally with the end cover 34, and the nut passing hole 54 is formed in the end cover 34. The nut member 24 is passed through the nut passing hole 54, and is integrally welded to the peripheral portion around the nut passing hole 54, for example, by arc welding. Therefore, the nut member 24 is more firmly fixed to the crush box 14R in a certain posture where the axis of the nut member 24 coincides with the axis O. Accordingly, it is possible to more efficiently and appropriately transmit a tow load from the nut member 24 to the crush box 14R, and it is possible to reduce the weight of the tow hook support device 20 by reducing the plate thickness of both the end cover 34 and the crush box 14R.

The tow hook support device 20 according to the first embodiment is configured with the use of the crush box 14R that is the vehicle structural member. The concave grooves 40 and 42 are formed along the entire axial length of the crush box 14R so that the axial strength of the crush box 14R is increased. Thus, it is possible to increase both the support strength with which the tow hook 22 is supported and the performance of absorbing impact energy, or it is possible to reduce the weight of the tow hook support device 20 by reducing the plate thickness of the crush box 14R, while ensuring the support strength and the performance of absorbing impact energy.

Next, a second embodiment of the invention will be described. In the second embodiment, portions that are substantially the same as those in the first embodiment will be denoted by the same reference numerals as those in the first embodiment, and detailed description thereof are omitted.

Figure 5A:
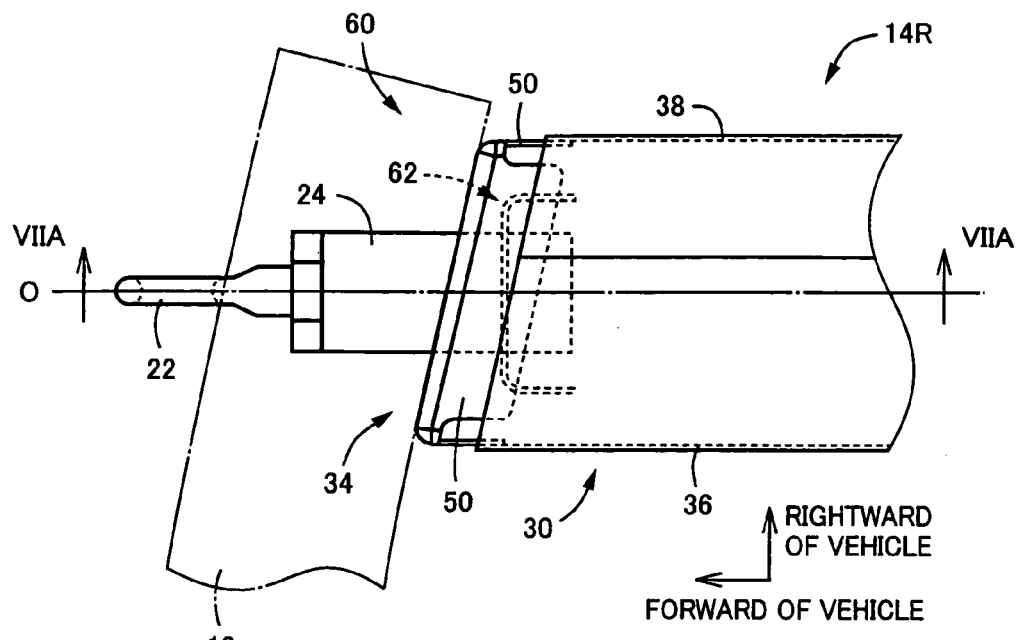
Figure 5B:
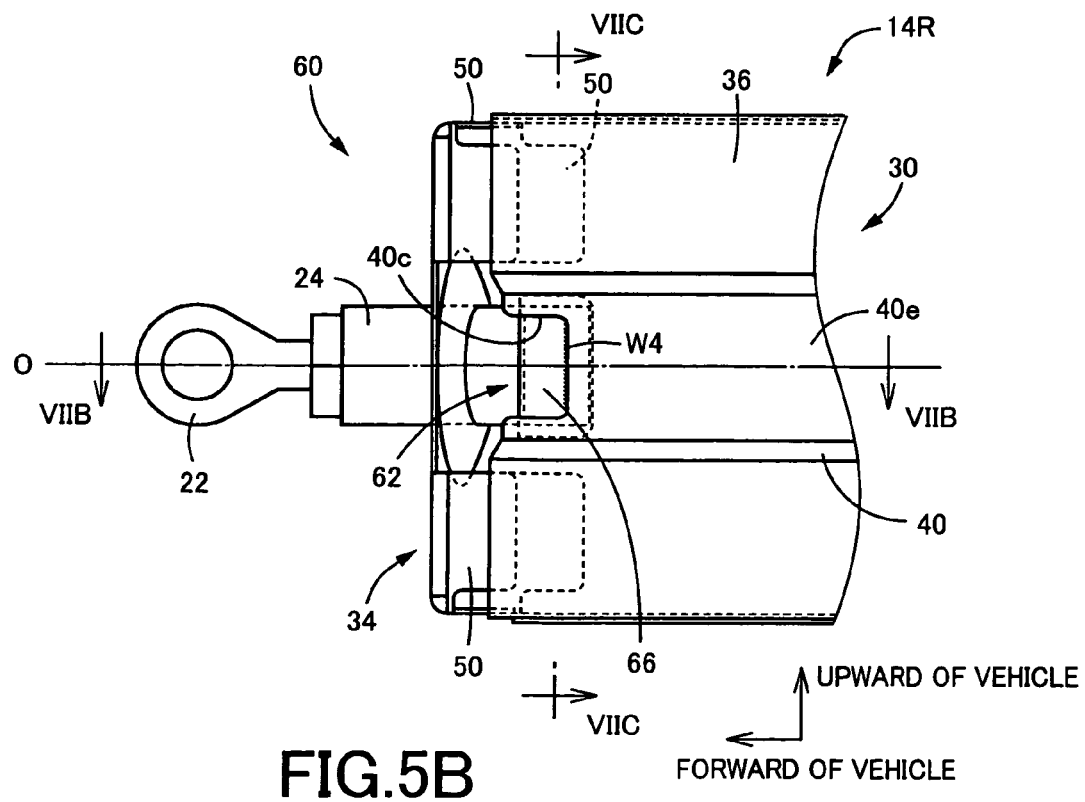
Figure 6A:
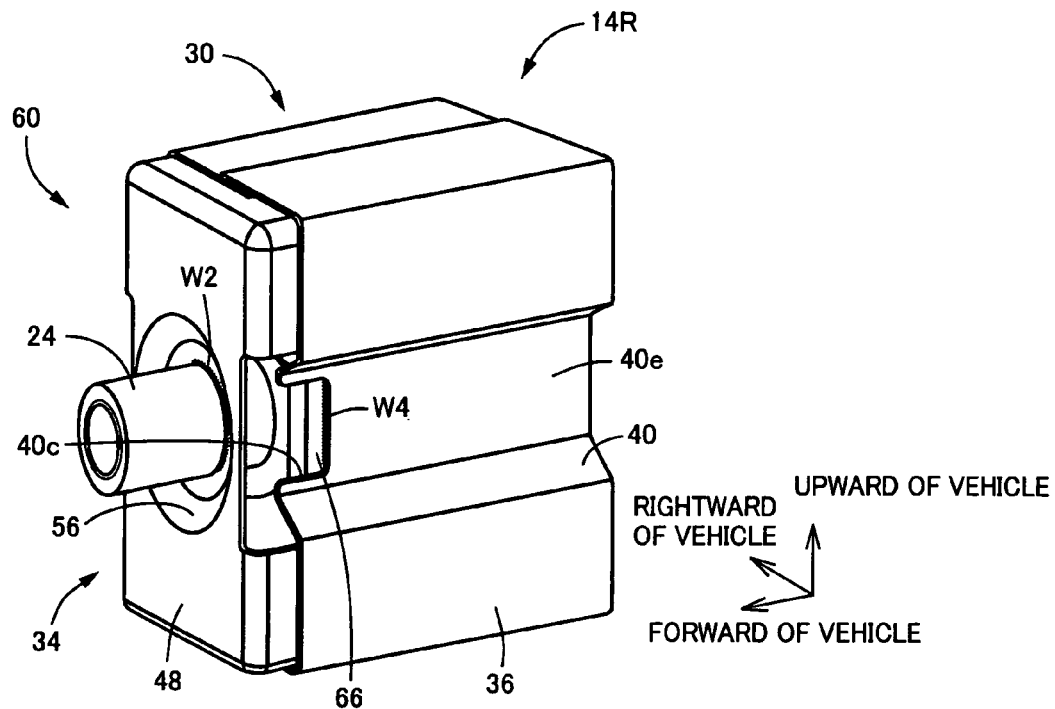
Figure 6B:
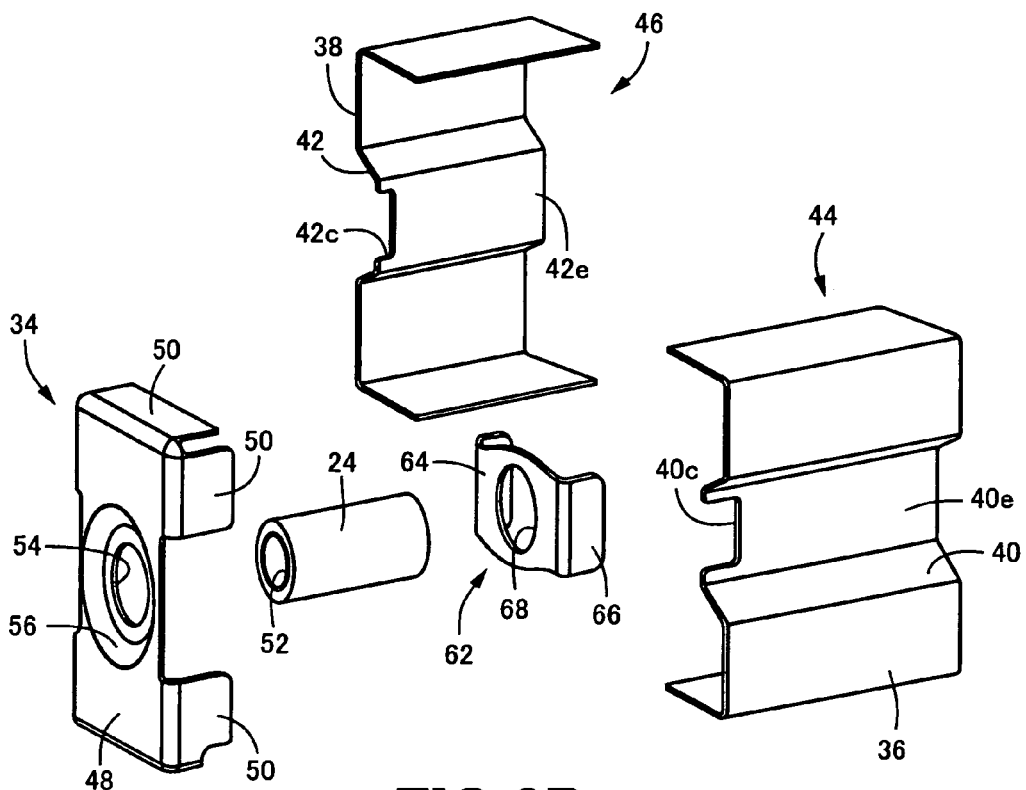

In a tow hook support device 60 shown in FIGS. 5A, 5B, 6A, 6B and 7A to 7C, the nut member 24 is fixed to the pair of the grooves 40 and 42, with the use of a fitting bracket 62. FIGS. 5A, 5B, 6A, 6B and 7A to 7C correspond to FIGS. 1A, 1B, 3A, 3B and 4A to 4C, respectively. That is, FIGS. 5A and 5B are views that illustrate the tow hook support device 60. FIG. 5A is a plan view of a tip portion to which the tow hook 22 is fitted. FIG. 5B is a side view of the tip portion viewed from a position under the tow hook support device in FIG. 5A. FIG. 6A is a perspective view of the tow hook support device 60 viewed from a position that is above and diagonally to the left front of the tow hook support device 60. FIG. 6B is an exploded perspective view of components before being integrally assembled together, for example, by welding. FIGS. 7A to 7C are sectional views that illustrate portions of the tow hook support device 60.

FIG. 7A is a sectional view taken along the line VIIA-VIIA in FIG. 5A. FIG. 7B is a sectional view taken along the line VIIB-VIIB in FIG. 5B. FIG. 7C is a sectional view taken along the line VIIC-VIIC in FIG. 5B.

The bottom portions 40e and 42e of the grooves 40 and 42 have flat plate shape, unlike the bottom portions 40e and 42e in the first embodiment. The bottom portions 40e and 42e are arranged so as to be apart from each other by a distance that is larger than the diameter of the nut member 24 and so as to be parallel to each other. Instead of the openings 40h and 42h in the first embodiment, rectangular cutouts 40c and 42c are formed in front end portions of the bottom portions 40e and 42e. The fitting bracket 62 is fixed to the bottom portions 40e and 42e at portions in which the cutouts 40c and 42c are formed. As is clear from FIG. 6B, the fitting bracket 62 is formed of a plate member that has a U-shaped cross section. The fitting bracket 62 has a flat front plate portion 64 that is at the center of the U-shaped fitting bracket 62, and a pair of bent portions 66 that are formed by bending portions of the plate, which forms the fitting bracket 62, from both ends of the front plate portion 64 substantially orthogonally toward the tubular body 30. A nut passing hole 68 is formed in the front plate portion 64 such that the center axis of the nut passing hole 68 coincides with the axis O of the tubular body 30. The nut passing hole 68 has a diameter that is equal to or slightly larger than the outer diameter of the nut member 24. The nut member 24 is passed through the nut passing hole 68, and the outer peripheral surface of the nut member 24 is integrally welded to a peripheral portion around the nut passing hole 68, for example, by arc welding. A third weld portion W3 shown in FIG. 7A is a portion at which the nut member 24 and the fitting bracket 62 are welded to each other.

The fitting bracket 62, to which the nut member 24 is integrally fixed, is fitted, in substantially parallel, into the tubular body 30 such that the bent portions 66, which are the both side portions of the fitting bracket 62, contact the pair of concave grooves 40 and 42 from the inside of the tubular shaped sidewall. Then, for example, arc welding is performed along the end edges of cutouts 40c and 42c, whereby the nut member 24 is integrally welded to the bottom portions 40e and 42e of the concave grooves 40 and 42. Thus, the nut member 24 is fixed integrally to the tubular body 30, at a position which is inside the tubular shaped sidewall and further inward than the paired concave grooves 40 and 42 respectively and at which the axis of the nut member 24 coincides with the axis O of the tubular body 30. A fourth weld portion W4 is a portion at which the fitting bracket 62 and the concave grooves 40 and 42 are welded to each other.

In the tow hook support device 60 according to the second embodiment, it is possible to increase the strength of the crush box 14R by forming the concave grooves 40 and 42, and it is possible to efficiently transmit a tow load from the fitting bracket 62 to the crush box 14R through the concave grooves 40 and 42 without imbalance. Therefore, it is possible to obtain the same effects as those in the first embodiment, for example, it is possible to easily and compactly form the tow hook support device 60 that includes the crush box 14R at low cost, while ensuring a predetermined support strength with which the tow hook 22 is supported. In addition, in the second embodiment, the nut member 24 is integrally fixed to the concave grooves 40 and 42 via the fitting bracket 62. Therefore, it is possible to easily fit the nut member 24 having a predetermined size to various vehicle structural members of a vehicle by just changing the fitting bracket 62.

The embodiments of the invention have been described in detail with reference to the accompanying drawings. However, the invention is not limited to the embodiments described above. The invention may be implemented in various other embodiments obtained by making various changes or modifications based on the knowledge of persons skilled in the art.

What is claimed is:

1. A tow hook support device for a vehicle, including a vehicle structural member having a tubular shaped sidewall, and integrally provided to a vehicle body in a posture such that an axial direction of the tubular shaped sidewall coincides with a longitudinal direction of the vehicle; and a nut member integrally fixed to a tip of the vehicle structural member so as to be extended parallel to the axial direction of the tubular shaped sidewall, to which a tow hook is screwed and detachably fitted, the tow hook support device comprising
    multiple grooves formed in the tubular shaped sidewall of the vehicle structural member so as to be positioned around an axis O of the tubular shaped sidewall and extended in the axial direction, by bending portions of the sidewall, and
    the nut member being arranged at a position in the tubular shaped sidewall and further inward than the multiple grooves so as to be coaxial with the axis O or extended parallel to the axis O, and the nut member or a fitting bracket to which the nut member is fixed being directly and integrally fixed to the multiple grooves so as to be brought into surface-contact with the multiple grooves.

2. The tow hook support device for a vehicle according to claim 1, wherein:
    at least an end portion of each of the grooves brought into surface-contact with an outer peripheral surface of the nut member, has a shape that corresponds to a shape of the outer peripheral surface of the nut member; and
    the nut member is directly and integrally fixed to the grooves by welding.

3. The tow hook support device for a vehicle according to claim 1, wherein:
    the grooves are a pair of concave grooves that are formed so as to be projected inward in the tubular shaped sidewall toward the axis O; and
    the nut member is arranged coaxially with the axis O, and is integrally fixed to the pair of concave grooves.

4. The tow hook support device for a vehicle according to claim 2, wherein:
    the grooves are a pair of concave grooves that are formed so as to be projected inward in the tubular shaped sidewall toward the axis O; and
    the nut member is arranged coaxially with the axis O, and is integrally fixed to the pair of concave grooves.

5. The tow hook support device for a vehicle according to claim 1, wherein the multiple grooves are formed so as to be axisymmetric or plane-symmetric with respect to the axis O.

6. The tow hook support device for a vehicle according to claim 2, wherein the multiple grooves are formed so as to be axisymmetric or plane-symmetric with respect to the axis O.

7. The tow hook support device for a vehicle according to claim 3, wherein the multiple grooves are formed so as to be axisymmetric or plane-symmetric with respect to the axis O.

8. The tow hook support device for a vehicle according to claim 1, wherein:
    the nut member is directly and integrally fixed to the fitting bracket.

9. The tow hook support device for a vehicle according to claim 1, wherein:
    the vehicle structural member includes an end cover that is integrally fixed to a tip of the tubular shaped sidewall; and
    a nut passing hole is formed in the end cover, the nut member is passed through the nut passing hole, and the nut member is integrally fixed to a peripheral portion around the nut passing hole in addition to the grooves.

10. The tow hook support device for a vehicle according to claim 2, wherein:
    the vehicle structural member includes an end cover that is integrally fixed to a tip of the tubular shaped sidewall; and
    a nut passing hole is formed in the end cover, the nut member is passed through the nut passing hole, and the nut member is integrally fixed to a peripheral portion around the nut passing hole in addition to the grooves.

11. The tow hook support device for a vehicle according to claim 3, wherein:
    the vehicle structural member includes an end cover that is integrally fixed to a tip of the tubular shaped sidewall; and
    a nut passing hole is formed in the end cover, the nut member is passed through the nut passing hole, and the nut member is integrally fixed to a peripheral portion around the nut passing hole in addition to the grooves.

12. The tow hook support device for a vehicle according to claim 5, wherein:
    the vehicle structural member includes an end cover that is integrally fixed to a tip of the tubular shaped sidewall; and
    a nut passing hole is formed in the end cover, the nut member is passed through the nut passing hole, and the nut member is integrally fixed to a peripheral portion around the nut passing hole in addition to the grooves.

13. The tow hook support device for a vehicle according to claim 6, wherein:
    the vehicle structural member includes an end cover that is integrally fixed to a tip of the tubular shaped sidewall; and
    a nut passing hole is formed in the end cover, the nut member is passed through the nut passing hole, and the nut member is integrally fixed to a peripheral portion around the nut passing hole in addition to the grooves.

14. The tow hook support device for a vehicle according to claim 7, wherein:
    the vehicle structural member includes an end cover that is integrally fixed to a tip of the tubular shaped sidewall; and
    a nut passing hole is formed in the end cover, the nut member is passed through the nut passing hole, and the nut member is integrally fixed to a peripheral portion around the nut passing hole in addition to the grooves.

15. The tow hook support device for a vehicle according to claim 8, wherein:
    the vehicle structural member includes an end cover that is integrally fixed to a tip of the tubular shaped sidewall; and a nut passing hole is formed in the end cover, the nut member is passed through the nut passing hole, and the nut member is integrally fixed to a peripheral portion around the nut passing hole in addition to the grooves.

16. The tow hook support device for a vehicle according to claim 1, wherein:
the vehicle structural member is a crush box that absorbs impact energy by crushing in an accordion manner upon reception of a compression load applied in the axial direction; and
the grooves are formed along an entire axial length of the crush box.

* * * * *